INVENTOR
THOMAS D. H. ANDREWS
ROBERT C. EELES
BY
Orland M. Christensen
ATTORNEY

United States Patent Office 3,366,073
Patented Jan. 30, 1968

3,366,073
HYDRAULIC DISPLACEMENT DEVICES
Thomas D. H. Andrews and Robert C. Eeles, Cheltenham, England, assignors to Dowty Technical Developments Limited
Filed Dec. 10, 1965, Ser. No. 512,942
2 Claims. (Cl. 103—171)

ABSTRACT OF THE DISCLOSURE

The disclosure concerns a hydraulic displacement device for relatively low lubricity liquids. In the device there is a rotary shaft having an eccentric cylindrical bearing member, a pair of cylinders disposed so that their axes extend in different directions from the shaft, a piston in each cylinder, and a connecting rod for each piston having a hollow cylindrical bearing attached thereto and rotatably carried on the eccentric bearing member. Each hollow cylindrical bearing has a first portion of substantial length in the axial direction parallel to the shaft rotation axis, at the position where the bearing joins its associated connecting rod; and a second portion of a shorter length in the aforesaid axial direction, at a position remote from the connecting rod. The connecting rods extend to their pistons in differing directions from the eccentric bearing member, the first portion of one hollow bearing lying adjacent to the second portion of the other hollow bearing, and the first portion of the other hollow bearing lying adjacent to the second portion of the one hollow bearing. In addition, the two hollow bearings lie between two planes which extend perpendicular to the shaft rotation axis, and are spaced apart less than the sum of the maximum axial dimensions of the hollow bearings. Lubrication is provided through a pair of holes in the eccentric bearing member which are fed with a portion of the aforesaid low lubricity liquid under pressure. The holes are cooperatively disposed in relation to the hollow cylindrical bearings so that each hole is covered by one of the bearings throughout all relative angular movement between the eccentric bearing member and the respective hollow bearings. In addition, in preferred embodiments of the invention, the hollow bearings have grooves therein extending partially around the same and opening into the cooperating holes in the eccentric bearing member during those strokes of the pistons in which high pressure acts on the pistons. The holes and the grooves are so co-operatively disposed in relation to one another that relative rotation between the eccentric bearing member and the hollow bearings causes the aforesaid liquid in the holes to flow between the eccentric bearing member and the aforesaid first portions of the hollow bearings during the pressure strokes of the respective pistons.

---

This invention relates to a hydraulic displacement device for use as a pump or as a motor with liquids at high pressure and more particularly although not exclusively for use with liquids of low lubricity.

In accordance with the present invention a hydraulic displacement device comprises a rotary shaft having an eccentric cylindrical bearing member, a pair of cylinders disposed so that their axes extend in different directions from the shaft, a piston in each cylinder, a connecting rod for each piston having attached thereto a hollow cylindrical bearing rotatably carried on the eccentric bearing member, each hollow cylindrical bearing having a first portion of substantial length in the axial direction parallel to the rotation axis at the position where it joins its associated connecting rod and a second portion of shorter length in the axial direction at a position remote from the connecting rod, the arrangement being such that the connecting rods extend to their pistons in differing directions from the eccentric bearing member and the first portion of one hollow bearing lies adjacent to the second portion of the other hollow bearing and the first portion of the other hollow bearing lies adjacent to the second portion of the one hollow bearing whereby the two hollow bearings lie between two planes extending perpendicular to the rotation axis which planes are spaced apart less than the sum of the maximum axial dimensions of the hollow bearings.

The lubrication of the hollow cylindrical bearings may be by means of liquid fed under pressure from holes in the eccentric bearing member, a hole co-operating with each hollow cylindrical bearing such that it is covered by the associated hollow bearing during all relative angular movement between the eccentric bearing member and the hollow bearing.

The hollow bearings are preferably each provided at their bearing surfaces with a groove which opens to the co-operating hole in the eccentric member at least over a substantial part of the angular extent of the bearing surface. Preferably the groove extends across the first part of the hollow cylindrical bearing such that liquid leaving that portion of the groove will be entrained by relative rotation to pass between the remainder of the first part of the hollow cylindrical bearing and the eccentric member.

Each connecting rod may form part of a combined connecting rod, gudgeon pin and piston assembly as disclosed in our co-pending application of even date herewith (U.K. patent application 47,492/64).

How the invention can be carried into effect will now be particularly described with reference to the accompanying drawings in which.

Figure 1:
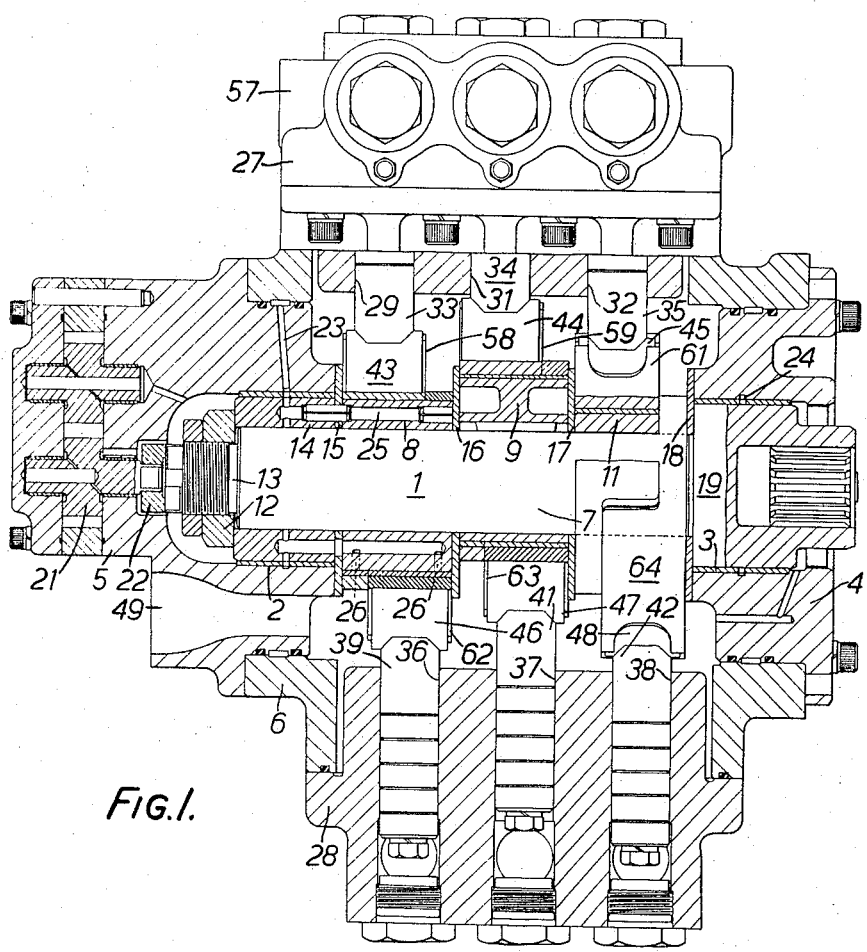
FIGURE 1 is a longitudinal cross-section through the embodiment.

The illustrated embodiment of the invention is intended particularly for use as a pump to supply liquid of low lubricity such as oil in water emulsions under high pressure. The crank shaft 1 of the pump is mounted at either end by plain bearings 2 and 3 carried by the end walls 4 and 5 of a crank case 6. The crank case comprises a central shaft 7 of uniform diameter on which three eccentric bearing members 8, 9 and 11 are secured by keys and by means of an endwise clamping nut 12 located on a screw-threaded portion 13 of the shaft 7. Endwise clamping force is transmitted through a cylindrical sleeve 14 and through spacing members 15, 16, 17 and 18 to an enlarged flange portion 19 of the shaft. The sleeve 14 forms one bearing of the shaft for co-operation with the bearing 2 and the flange 19 forms another bearing for co-operation with the bearing 3.

Within the end wall 5 a gear pump 21 is provided which is driven by an extension 22 from the shaft 7. The gear pump 21 draws liquid from the crankcase and delivers it to passages 23 and 24 to enter the main bearings 2 and 3 and to pass through passages 25 within the sleeve 14, the eccentrics, the enlarged flange portion 19, and the spacing members to ports 26 of which two open into the cylindrical bearing surface of each eccentric bearing member.

A pair of cylinder blocks 27 and 28 are secured to the crank case on opposite sides of the crank shaft. Within the cylinder block 27 are located three mutually parallel cylinders 29, 31 and 32. Each of these cylinders includes a long piston indicated respectively at 33, 34 and 35. Within the cylinder block 28 there are three mutually parallel cylinders 36, 37 and 38 which contain respectively the pistons 39, 41 and 42. Each piston is provided with a gudgeon pin indicated respectively at 43, 44, 45, 46, 47 and 48. These gudgeon pins are arranged as disclosed in our said co-pending application number 47,492/64, in that they are of substantial dimensions compared with the cross sections of the co-operating cylinders, and also that they are externally disposed of the cylinders. Liquid from a reservoir enters into the crank case through passage 49. Some liquid leaves the crank case through three parallel passages 51 which extend parallel to the cylinders 29, 31 and 32. The remainder of the liquid flow leaves the crank case through a further set of three passages 52, which extend parallel to the three cylinders 36, 37 and 38. For each cylinder an inlet non-return valve 54, and a delivery non-return valve 55 are provided. The inlet valves are fed with liquid from the respective passages 51 or 52. The delivery valves of each of the blocks deliver into a passage 56 extending transversely through the blocks. The passages 56 are terminated at delivery connections 57. Externally of the pump the two delivery connections 57 may be connected together if so desired.

For each piston a connecting rod indicated respectively at 58, 59, 61, 62, 63 and 64 is provided. Of these the connecting rods 58 and 62 only will be described in detail to show how they engage the eccentric bearing member 8. The arrangement of the other two pairs of connecting rods 59, 63 and 61, 64 on their respective eccentric bearing members 9 and 11 is the same as the arrangement of the connecting rods 58 and 62 on the eccentric bearing member 8. The connecting rod 58 comprises a gudgeon pin bearing 65 integrally formed with a hollow bearing 66. The hollow bearing 66 comprises a continuous strap which completely encircles the eccentric bearing member 8. This strap is lined around its interior surface with a suitable bearing metal. Adjacent to the gudgeon pin bearing 65 the hollow bearing 66 includes a first part 67 whose length measured in the axial direction i.e. parallel to the rotation axis of the crank shaft, is about three-quarters of the axial length of the eccentric bearing member 8. The second part 68 of the bearing 66 remote from the gudgeon pin bearing 65 is considerably reduced in its axial dimension and is only about one-quarter of the axial length of the eccentric bearing member. The second portion 68 is located at one end of the axial length of the hollow bearing 66 so that two similar connecting rods may be secured together on one eccentric bearing member as shown particularly at FIGURE 1 by the connecting rods 61 and 64 on the eccentric bearing member 11. In particular the second part 68 of one hollow bearing extends by the side of the first part 67 of the other hollow bearing and the second part 68 of the other hollow bearing extends by the side of the first part 67 of the one hollow bearing. The angular extent of the first part 67 of each hollow bearing around the eccentric bearing member must be less than 180 degrees in order to accommodate the relative angular movement that will occur between the connecting rods during rotation of the crank shaft to reciprocate the pistons.

Within each eccentric bearing member two ports 26 are provided which are fed with low pressure liquid from the pump 21. These two ports 26 are located near to the two limits of axial length of the eccentric bearing member as shown particularly for the eccentric bearing member 8 in FIGURE 1. In this way each of the ports 26 is continuously closed by a hollow bearing.

Figure 2:
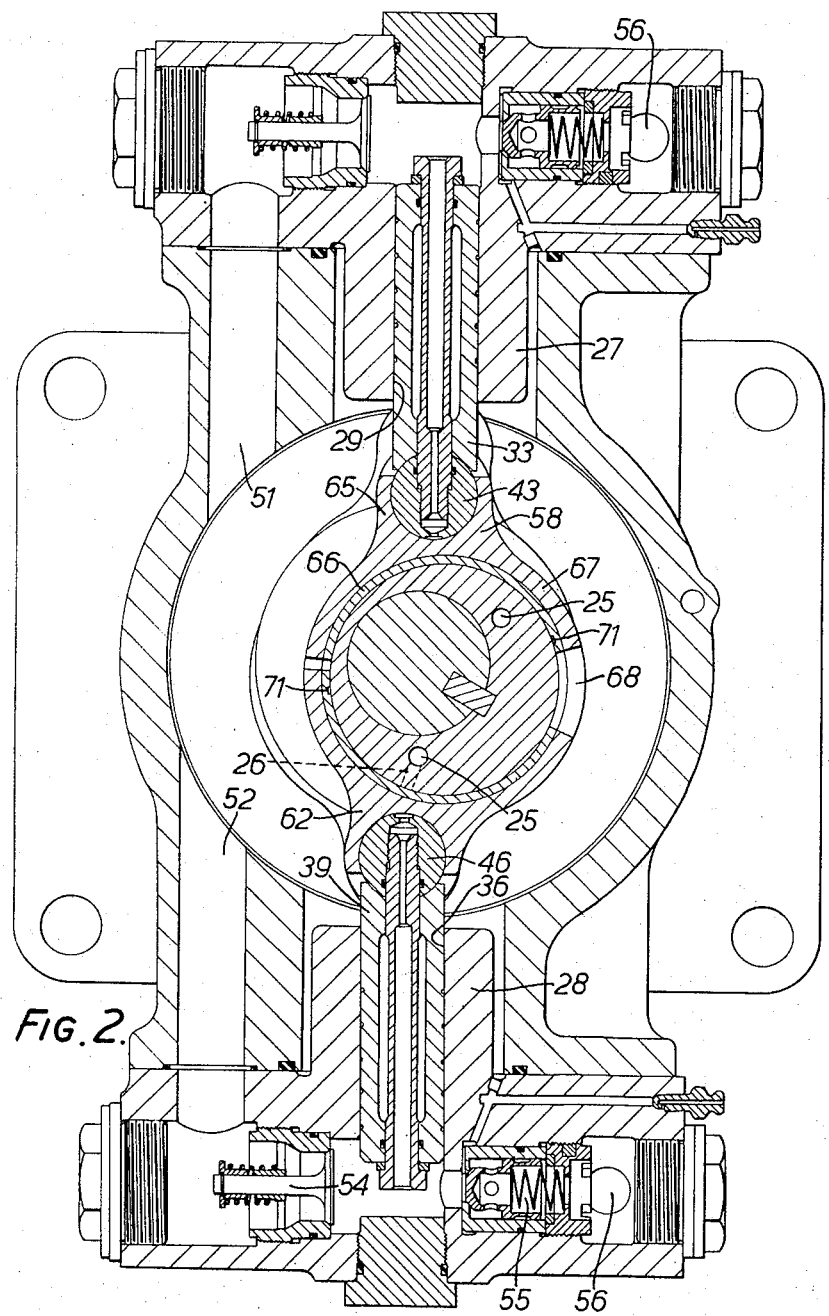
FIGURE 2 is a transverse cross-sectional view through the embodiment.
Figure 3:
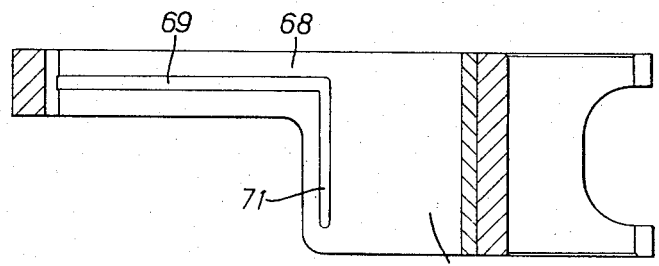
FIGURES 3 and 4 are detailed views of a connecting rod and hollow bearing as used in FIGURES 1 and 2.
Figure 4:
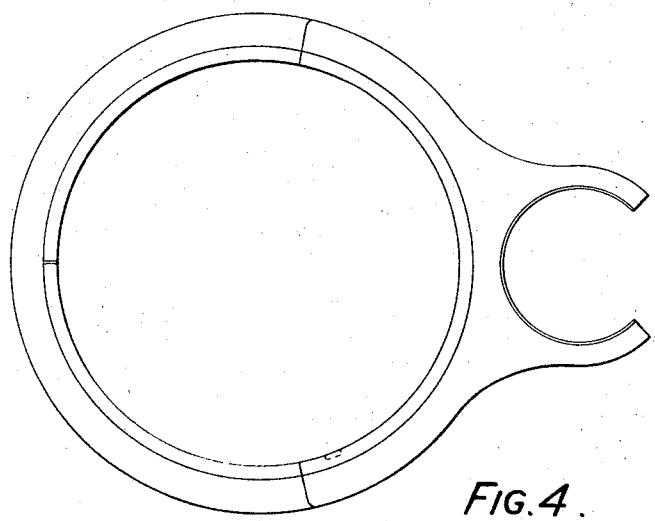

To facilitate distribution of liquid at low pressure between the hollow bearing surfaces and the eccentric bearing members each hollow bearing 66 is provided with a groove formed in two portions 69 and 71 shown more clearly by way of example in FIGURE 3. It will be appreciated that each of the hollow bearings includes the groove arrangement shown in FIGURE 3. The groove portion 69 extends around the interior of the second part 68 of bearing 66 and the groove portion 71 extends axially along the first part 67 of the bearing 66. If reference is made to FIGURE 2 the position of the groove portions 71 will be more clearly appreciated. The direction of shaft rotation as seen in FIGURE 2 is anti-clockwise and the location of the groove portion 71 is such that liquid supplied from it will be carried by rotation of the eccentric bearing member over the effective bearing area of the first portion 67 of each hollow bearing. It is also arranged that during the stroke of each piston from bottom dead centre to top dead centre each port 26 is in connection with a groove portion 69 whereby during the complete movement of the piston from bottom dead centre to top dead centre there is a continuous supply of pressure liquid into the groove 71. The groove portion 69 extends only partially around the bearing surface of the second portion 68 of each hollow bearing 66 and it is arranged to open into the associated port 26 only during and slightly before the pressure stroke of the associated piston i.e. movement of the piston from bottom dead centre to top dead centre. When the piston is moved by the eccentric bearing member from top dead centre to bottom dead centre the groove portion 69 does not coincide with its co-operating port 26 and the amount of pressure liquid supplied is therefore considerably smaller. Since on this stroke the force exerted on the piston by the eccentric is very small no undue wear will occur and some economy will thereby be obtained in the supply of liquid from the pump 21.

Because of the considerable thrust exerted on the pistons during their movements from bottom dead centre to top dead centre the axes of the cylinders are offset so that they do not intersect the rotation axis of the crank shaft. In FIGURE 2 the offsetting of the cylinders is arranged for anti-clockwise rotation such that the average inclination of the connecting rod to the axis of the piston is very small during movement of the piston from bottom dead centre to top dead centre. It will be seen particularly from FIGURE 1 that for each pair of opposed pistons, for example the pistons 33 and 39, the axial length of the co-operating hollow bearings is considerably less than the sum of their maximum axial lengths. This results from the provision of the hollow bearings 66 with the second portions 68 of reduced axial lengths. If each hollow bearing 66 were of constant axial length over the whole bearing surface then the whole length of the illustrated pump in the axial direction would be considerably greater without any effective increase in the pumping capacity or in the reliability. The illustrated embodiment is dynamically more effectively balanced than is a pump with hollow bearings 66 of constant axial length in that the axes of each pair of opposed pistons are closely aligned and therefore operate with less dynamic unbalance.

In the described embodiment each pair of cylinders is arranged substantially in the radial sense having regard to the axis of the crank shaft, and the total axial extent of the hollow bearings 66 is reduced from the sum of the maximum axial dimensions of these hollow bearings. It will be appreciated that the invention may be applied to arrangements where there are more than two substantially radially arranged cylinders in order to obtain compactness in design and efficiency of bearing operation. For example there may be five substantially radially arranged cylinders co-operating with one eccentric of the crank shaft, the total axial extent of the hollow bearings being considerably less than the sum of the maximum axial dimensions of these bearings.

We claim as our invention:

1. In an hydraulic displacement device for relatively low lubricity liquids, a rotary shaft having an eccentric cylindrical bearing member, a pair of cylinders disposed so that their axes extend in different directions from the shaft, a piston in each cylinder, a connecting rod for each piston having a hollow cylindrical bearing attached thereto and rotatably carried on the eccentric bearing member, each hollow cylindrical bearing having a first portion of substantial length in the axial direction parallel to the shaft rotation axis, at the position where the bearing joins its associated connecting rod, and a second portion of a shorter length in the aforesaid axial direction, at a position remote from the connecting rod, said connecting rods extending to their pistons in differing directions from the eccentric bearing member, the first portion of one hollow bearing lying adjacent to the second portion of the other hollow bearing, and the first portion of the other hollow bearing lying adjacent to the second portion of the one hollow bearing, and the two hollow bearings lying between two planes perpendicular to the shaft rotation axis, which planes are spaced apart less than the sum of the maximum axial dimensions of the hollow bearings, there being a pair of holes in the eccentric bearing member, and means for forcing a portion of the aforesaid liquid under pressure into the holes, said holes being cooperatively disposed in relation to the hollow cylindrical bearings so that each hole is covered by one of the bearings throughout all relative angular movement between the eccentric bearing member and the respectively hollow bearings, and the hollow bearing having grooves therein extending partially around the same and opening into the cooperating holes in the eccentric bearing member during those strokes of the pistons in which high pressure acts on the pistons, the holes and the grooves being so cooperatively disposed in relation to one another that relative rotation between the eccentric bearing member and the hollow bearings causes the aforesaid liquid in the holes to flow between the eccentric bearing member and the aforesaid first portions of the hollow bearings during the pressure strokes of the respective pistons.

2. A hydraulic displacement device according to claim 1 wherein each groove has a transversely extending component in the aforesaid first portion of the respective hollow bearing.

References Cited

UNITED STATES PATENTS

| | | | |
|---|---|---|---|
| 1,354,852 | 10/1920 | Schneider | 74—605 X |
| 2,107,344 | 2/1938 | Rodeghier | 103—171 |
| 3,044,682 | 7/1962 | Weibel et al. | 230—185 |
| 3,211,365 | 10/1965 | Phelps | 230—206 |

FOREIGN PATENTS

| | | |
|---|---|---|
| 1,081,908 | 6/1954 | France. |
| 392,992 | 1/1933 | Great Britain. |
| 668,768 | 3/1952 | Great Britain. |

ROBERT A. O'LEARY, *Primary Examiner.*

WILLIAM L. FREEH, DONLEY J. STOCKING,
*Examiners.*